United States Patent
Sajadi et al.

(10) Patent No.: US 12,296,512 B2
(45) Date of Patent: May 13, 2025

(54) METHOD AND APPARATUS FOR COMPACTING A POWDER LAYER

(71) Applicant: Sakuu Corporation, San Jose, CA (US)

(72) Inventors: Seyed Mohammad Sajadi, Sunnyvale, CA (US); Morteza Vatani, Los Gatos, CA (US); Siamak Azizi, Los Gatos, CA (US)

(73) Assignee: Sakuu Corporation, San Jose, CA (US)

( * ) Notice: Subject to any disclaimer, the term of this patent is extended or adjusted under 35 U.S.C. 154(b) by 139 days.

(21) Appl. No.: 18/084,491

(22) Filed: Dec. 19, 2022

(65) Prior Publication Data

US 2023/0226727 A1     Jul. 20, 2023

Related U.S. Application Data

(60) Provisional application No. 63/299,838, filed on Jan. 14, 2022.

(51) Int. Cl.
| | | |
|---|---|---|
| *B29C 43/24* | (2006.01) | |
| *B29C 43/28* | (2006.01) | |
| *B29C 43/30* | (2006.01) | |
| *B29K 67/00* | (2006.01) | |
| *B29L 9/00* | (2006.01) | |

(52) U.S. Cl.
CPC .............. *B29C 43/24* (2013.01); *B29C 43/28* (2013.01); *B29C 43/305* (2013.01); *B29K 2067/003* (2013.01); *B29K 2995/0097* (2013.01); *B29L 2009/00* (2013.01)

(58) Field of Classification Search
CPC ... B29C 43/24; B29C 43/48; B29C 2043/486; B05D 1/42; B05D 1/40
See application file for complete search history.

(56) References Cited

U.S. PATENT DOCUMENTS

| | | | |
|---|---|---|---|
| 5,876,550 A | 3/1999 | Feygin et al. | |
| 6,474,104 B1 * | 11/2002 | Campbell | ............... C03C 19/00 65/60.5 |
| 2005/0104241 A1 | 5/2005 | Kritchman et al. | |
| 2011/0024938 A1 | 2/2011 | Tripp et al. | |
| 2019/0381731 A1 | 12/2019 | Walsh et al. | |

(Continued)

FOREIGN PATENT DOCUMENTS

| | | | | |
|---|---|---|---|---|
| CN | 105149714 A | * | 12/2015 | ........... B23K 1/0004 |

OTHER PUBLICATIONS

International Search Report and Written Opinion issued May 15, 2023 in corresponding PCT/US23/60761 filed Jan. 17, 2023—13 pages.

*Primary Examiner* — Xiao S Zhao
*Assistant Examiner* — Nicholas J Chidiac
(74) *Attorney, Agent, or Firm* — Arman Khosraviani

(57) ABSTRACT

The present disclosure pertains to an improved method and apparatus for compacting a powder layer. An exemplary method comprises placing the substrate on a first plate, placing a second plate over the powder layer so that the substrate and the powder layer are sandwiched between the first plate and the second plate to form a multilayered structure comprising the first plate, the substrate, the powder layer and the second plate, and calendering the multilayered structure between a top calendering roller and a bottom calendering roller.

19 Claims, 3 Drawing Sheets

(56) References Cited

U.S. PATENT DOCUMENTS

2020/0361147 A1 11/2020 Beniya et al.
2021/0354202 A1 11/2021 Anthony et al.
2022/0016708 A1 1/2022 Ng et al.
2024/0117126 A1* 4/2024 Takagi .................... C08K 3/38

* cited by examiner

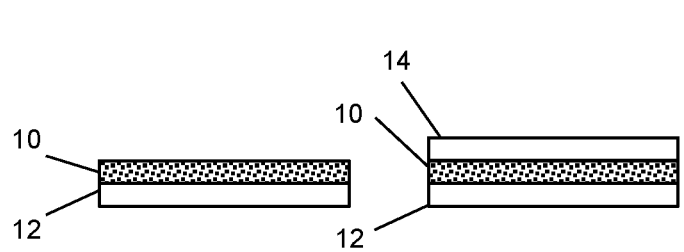
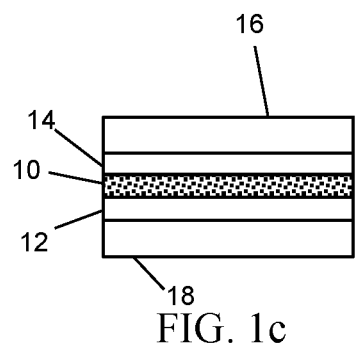
FIG. 1a  FIG. 1b  FIG. 1c
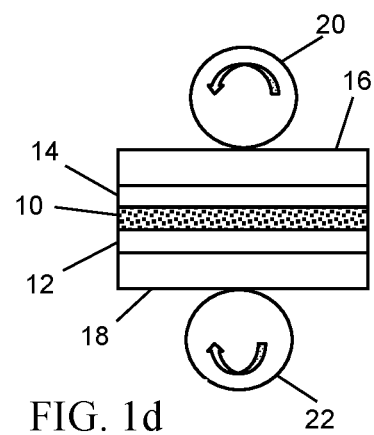
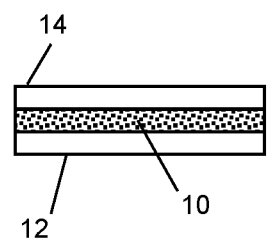
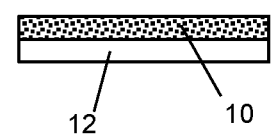
FIG. 1d  FIG. 1e  FIG. 1f
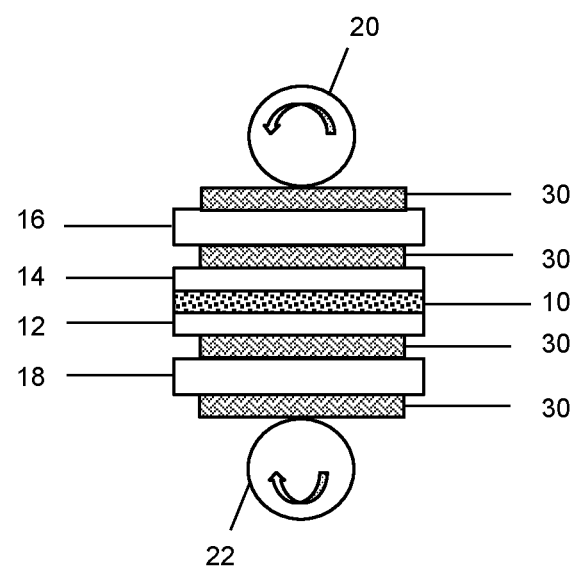
FIG. 1g

METHOD AND APPARATUS FOR COMPACTING A POWDER LAYER

TECHNICAL FIELD AND BACKGROUND

The present disclosure pertains to an improved method and apparatus for compacting a powder layer, and, more particularly, for compacting a non-cured powder layer before curing and stacking of the layer in an additive manufacturing operation such as 3D printing.

In additive manufacturing (AM), such as 3D printing systems, the layers are built on top of each other, or they are built on a conveyor belt, and, at the last stage, they are stacked on each other. In such systems, it is known that higher density in green parts (e.g., powder layers prior to curing) leads to the higher density of the final part after post-processing operations such as sintering.

In the conventional AM industry, it is known to modify the morphology of the powder to get high packing density right after deposition of the powder. This is especially important in applications that need high density in the final part (i.e., the final 3D printed object made up of a plurality of the individual stacked layers, following depositing individual powder layers on a conveyor belt and performing various processing operations on the deposited layers before stacking them). However, there are currently no other available options to increase the density of the green part due to the fragility of the powder layers while they are still at the green (non-cured) stage. Therefore, there is a need for increasing the density of powder layers in such AM processes while the powder layers are still in the green stage, without changing the morphology of the powder.

SUMMARY OF THE INVENTION

A method for calendering a powder layer formed on a substrate, including placing the substrate on a first plate, placing a second plate over the powder layer so that the substrate and the powder layer are sandwiched between the first plate and the second plate to form a multilayered structure comprising the first plate, the substrate, the powder layer and the second plate, and calendering the multilayered structure between a top calendering roller and a bottom calendering roller.

An apparatus for calendering a powder layer formed on a substrate, including a pair of plates, comprised of a first plate and a second plate configured to sandwich the substrate and the powder layer between the first plate and the second plate to form a multilayered structure comprising the first plate, the substrate, the powder layer and the second plate, and a top calendering roller and a bottom calendering roller configured to calender the multilayered structure therebetween.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 1a-1g show views of a calendering process, in accordance with aspects of the present disclosure.

DETAILED DESCRIPTION

Figure 2A:
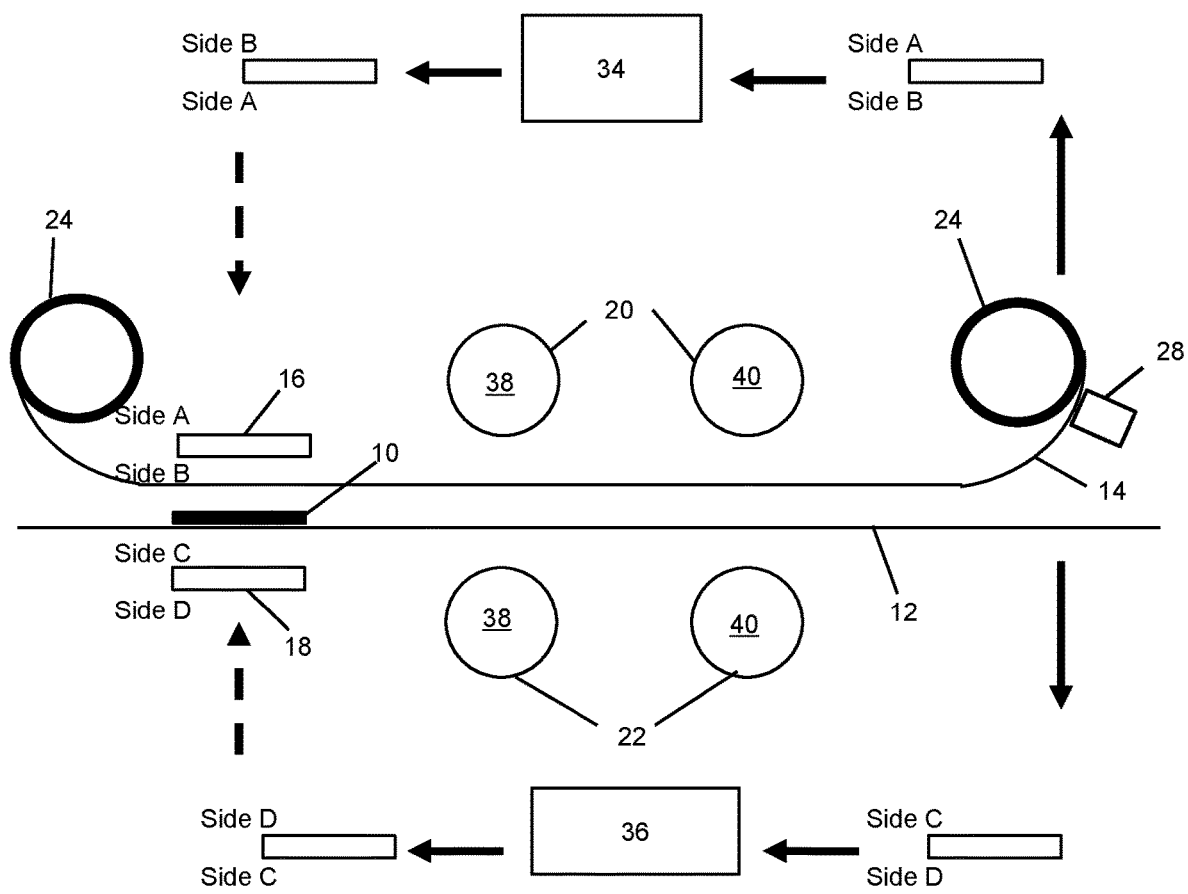
FIGS. 2a and 2b show apparatus for carrying out the process shown in FIGS. 1a-1g, in accordance with aspects of the present disclosure.

In the following detailed description, numerous specific details are set forth by way of examples to provide a thorough understanding of the disclosed subject matter. It may become apparent to persons of ordinary skill in the art, though, upon reading this disclosure, that one or more disclosed aspects may be practiced without such details. In addition, description of various example implementations according to this disclosure may include referencing of or to one or more known techniques or operations, and such referencing can be at relatively high-level, to avoid obscuring of various concepts, aspects and features thereof with details not particular to and not necessary for fully understanding the present disclosure.

As described in a related provisional application by the Applicant (Application No. 63/299,867), entitled "Printing Method and Apparatus for Additive Manufacturing, Including In-situ Powder Regeneration," filed on Jan. 14, 2022, and which is hereby incorporated by reference, a platform for AM manufacturing has been developed which is a modular base machine that builds each layer separately. Each individual layer passes several stations, and each station has a unique function. One of these stations includes compaction of the green powder while the deposited powder layers are still in the green non-cured stage. Thus, a method and an apparatus are disclosed herein which are particularly adapted to the new platform described in the above-noted related application. Specifically, in the platform described in this related application, due to the nature of the platform, the powder layers can be conditioned individually, so it is possible to increase the packing density of the layers separately, without changing the morphology of powder, by calendering the layers.

The related application noted above describes a system and a method for applying powder to a substrate at a powder deposition station, removing first portions of the powder to create clean portions of the substrate between portions of deposited powder, moving the portions of deposited powder remaining on the substrate to a wetting station and wetting the powder with a wetting agent at the wetting station, passing the wetted portions of deposited powder through calendering rollers to compact the powder, cutting the substrate at the clean portions to create substrate segments each respectively including one of the portions of the deposited powder, moving the substrate segments having the portions of deposited powder, to a binder applying station and applying a binder to the powder at the binder applying station to harden the deposited powder to form a patterned layer transferring the substrate segments having the layers mounted thereon to respective carrier plates, and moving the carrier plates, with the substrate segments having the layers mounted thereon, to a stacking station, and inverting each of the carrier plates in order to separate the layers from the substrate segments and to stack the layers individually on one another to form a multilayer product. The present disclosure can be incorporated into the system described in the related application as part of the calendering of the powder while it is in a green, non-cured stage in the overall 3D printing operation. It is noted that, although a certain order of steps is discussed above, the order of the steps could be changed, if desired, without departing from the scope of this disclosure.

As described in another related provisional application by the Applicant (application Ser. No. 18/074,236), entitled "Apparatus and Method to Provide Conditioning to a Deposited Powder," filed on Dec. 2, 2022, and which is hereby incorporated by reference, a calendering roller apparatus is described which uses coatings and/or covering layers to control surface energy during powder compaction using the calendering rollers. The present disclosure can be incorporated into the system described in this other related application as part of the overall calendering operation while the powder is in a green, non-cured stage in the overall 3D printing operation.

More specifically, the present disclosure pertains to an improved method and apparatus for compacting a powder layer, and, more particularly, for compacting a non-cured powder layer before curing and stacking of the layer in an additive manufacture operation, such as a 3D printer. Specifically, the present disclosure provides a method and apparatus to compact each powder layer while it is still in a green, non-cured stage separately before curing and/or stacking a plurality of these layers together to form a final object. This compacting of the individual layers while they are still in the green stage allows for increasing the density of the green, non-cured layer, which eventually leads to higher density in the final printed object, made up of multiple ones of the layers, after post-processing. In this method and apparatus, calendering rollers are employed to compact the powder. In particular, in accordance with the present disclosure, two plates are used, a first plate on a lower surface and a second plate on an upper surface of the powder layer, to change a line pressure, normally provided by the calendering rollers, to a plane pressure spread across the upper and lower surfaces of the green powder layer.

For the compaction of powder, two choices were investigated, specifically, calendering rollers and a press. The press process is a stop and start process. Also, it was determined that maintaining gap tolerances in a press operation is challenging. In addition, a press is costly, noisy, and has a bigger footprint than a calendering roller system. Further, there are more safety issues with a press than with a calendering roller system. Thus, it was determined that using a calendering roller operation with the platform described in the above-noted related applications can be more favorable compared to using a press. However, calendering powder by itself is challenging since, in a calendering roller system, it is necessary to use large rollers, otherwise, the contact area is small (essentially a line contact) which could cause distortion to the powder layer on both its upper and lower surfaces. To solve this issue in the present disclosure, top and bottom plates are utilized, in conjunction with the calendering rollers, to transfer the point of contact from a line contact to a plane contact to get more uniform pressure within the powder layer, and to avoid distortion of the powder layer during the calendering operation.

Referring to FIG. 1a, a first step in the overall process is shown in which a powder 10 is deposited onto a substrate 12, for example, a Mylar substrate in the form of a conveyor belt. Although Mylar is used as an example, it is noted that another flexible material could be used, if desired. After this initial deposition, referring to FIG. 1b, a protective layer 14 (a second flexible material), such as a Mylar layer similar to the substrate material, can be placed on top of the deposited powder 10. Other flexible materials could be used, if desired, rather than Mylar, for the protective layer 14. Further, the flexible layer material can be the same as the substrate material, or a different flexible material. This protective layer 14 is used to avoid direct contact of the powder layer 10 with a rigid top plate 16 placed on top of the protective layer 14, as shown in FIG. 1c. As also shown in FIG. 1c, a bottom plate 18 is provided under the flexible substrate 12. In one implementation, provision of the protective layer 14 may be provided by a roll or spool of the protective material, as will be discussed below with regard to FIGS. 2a and 2b.

FIG. 1d shows calendering the powder layer by passing the multilayer structure, made up of the bottom plate 18, the flexible substrate 12, the powder layer 10, the protective layer 14 and the top plate 16, through upper and lower calendering rollers 20 and 22. By virtue of the use of the top and bottom plates 16 and 18 in this operation, the contact with the powder layer 10 is changed from a line contact, which would normally be applied by the calendering rollers 20 and 22, to a plane contact across the upper and lower surfaces of the powder layer 10.

Depending on the requirements for compaction to achieve a desired degree of layer density, the calendering step shown in FIG. 1d can be repeated multiple times. In particular, in this method, pressure can be applied gradually using the top and bottom plates as well using multiple calender rollers 20 and 22, if desired, to reach the target pressure. For example, the same powder layer 10 can be calendered several times, with the pressure being increased each time, so that the desired amount of compaction of the powder 10 is gradually achieved. As such, the top and bottom plates 16 and 18 are employed to expand the pressure area to compact the powder layer 10 through the roller operation and to achieve uniform pressure quickly within the powder layer 10, but, if necessary, this process can be spread out over repeated calendering operations on each layer to avoid distortion of the fragile powder layer in its green, non-cured state.

Figure 2B:
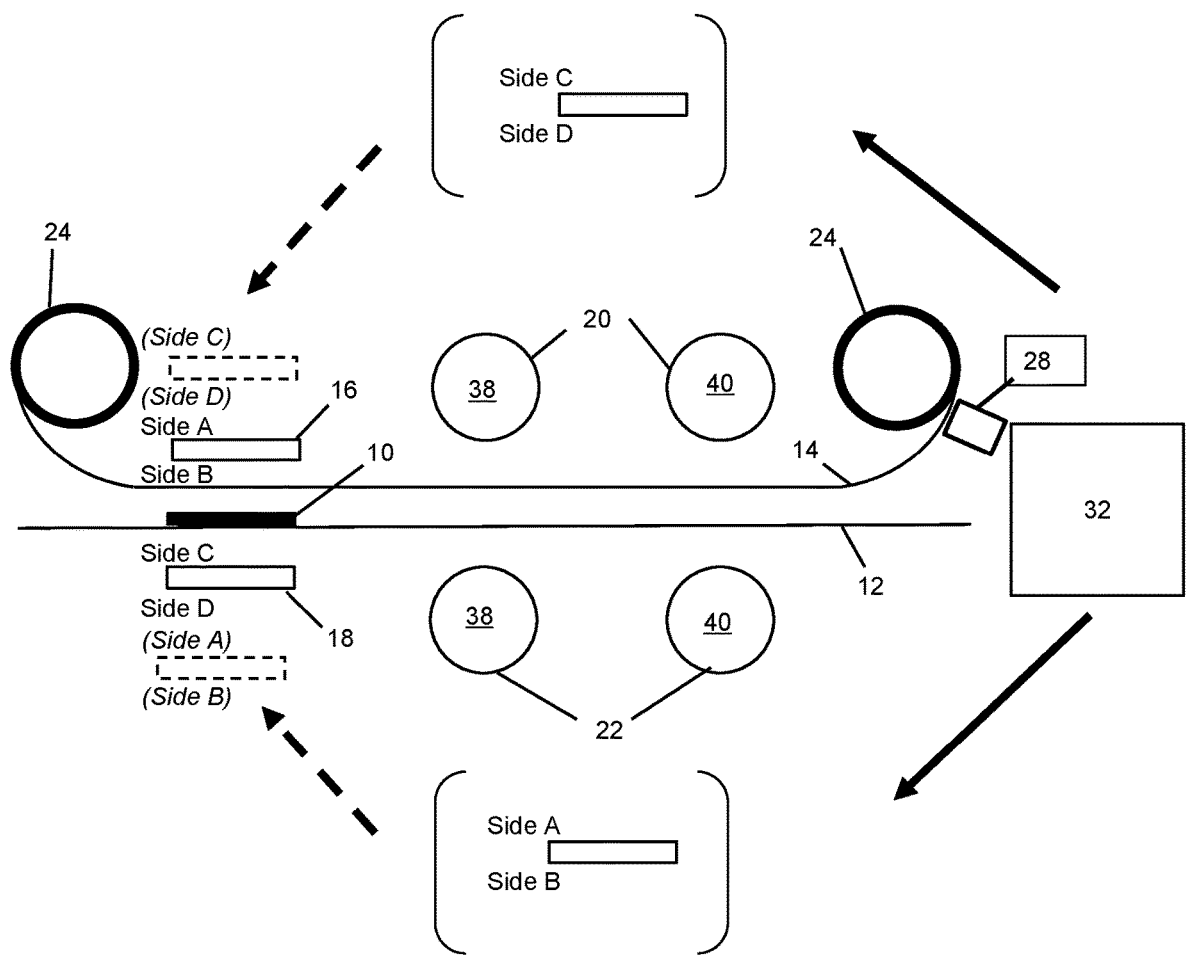

To avoid the deformation of the top and bottom plates 16 and 18 through multiple calendering operations, whether on the same layer or between calendering operations on different layers, a plate switch mechanism 32 can be provided, as shown in FIG. 2b, to switch the top and bottom plates 16 and 18 with each other after each calendering operation to make sure that both of the plates receive the same amount of pressure through the multiple repetitions of the calendering process. This will ensure that the plates wear at the same rate over time so that one plate will not wear differently than the other, which could lead to uneven pressure on one side of the powder layers 10 than on the other side thereof. In an alternative implementation, as shown in FIG. 2a, rather than switching the top and bottom plates 16 and 18 with one another, or in addition to such switching, the plates themselves could be turned over (rotated 180 degrees) periodically with a first mechanism 34 and a second mechanism 36 (e.g., after each calendering operation or after a predetermined number of calendering operations), so the upper side and the lower side of each plate wears evenly over the course of many calendering operations. In an alternative implementation, the top and bottom plates 16 and 18 are switched with one another and the plates themselves are turned over (rotated 180 degrees) simultaneously.

Referring next to FIG. 1e, following the calendering operation on a powder layer 10, both the top and bottom plates are removed. Next, as shown in FIG. 1f, the protective layer 14 is removed from the top of the powder layer 10. By virtue of this combined operation shown in FIGS. 1a-1f, an even pressure is applied to the green, non-cured powder layer 10 to achieve compaction of the powder layer without the need for such measures as changing the morphology of the powder. After the protective layer 14 is removed from the top of the powder layer 10, the powder layer can be transferred to the next stage of processing in the overall 3D printing process. In one implementation, removal of the protective layer 14 may be facilitated by passing the protective layer over a destination roller or spool 24 located at one end above the substrate 12, such that the protective layer 14 can be separated from the substrate 12 gradually at one end, in a peeling motion. The rotary speeds of the roller(s) 20 and 22 may be independently controllable based on the amount of protective layer 14 spooled. Additionally, the rotary speed(s) of the rollers 20, 22 and the linear speed of the substrate 12 may be synchronized, the speeds varied to facilitate continuous operation. In another implementation, one or more sensors (not shown) may monitor the diameter of the spool 24, and this information be fed back to the modify the linear speed of the substrate 12 and/or the rotary speed of the either of the spools 24.

In some implementations, any residual powder 10 that may adhere to the underside of the protective layer 14 as it is lifted from the substrate 12, may be removed by a cleaning system 28. This cleaning system 28 may take the form of a roller, brush, magnetic brush, or wiper blade, or example. The removed powder may be collected in a receptacle (not shown) for reconditioning of powder for eventual reuse.

In an alternative implementation, as illustrated in FIG. 1g, one or more pressure conveyance media, such as a flexible/compliant layer 30 may be incorporated to compensate for any surface roughness that may be present within the powder layer 10, by minimizing any non-uniformity that may exist within the distribution of the powder layer 10. This compliant layer 30 may be provided as an additional layer of compliant material, such as rubber or PDMS (Polydimethylsiloxane), or in one implementation may be provided by increasing the thickness of the substrate layer 12, for example, using a thicker Mylar substrate beneath the powder 10. The compliant layer 30 aids in providing uniform transference of pressure from the calendaring to the entire powder layer 10, minimizing any gaps that may exist between the powder layer 10 and the plates 16 and 18, and improving contact between the surfaces. One more additional compliant layer 30 may also be provided between the upper/lower plates 16 and 18 and the upper/lower calender rollers 20 and 22. Each of the compliant layers 30 may comprise the same material, or different materials, based on location with respect to the powder 10. The thickness of the compliant layers 30 may range from 100 µm to 2 mm, for example being between 0.5 mm and 0.67 mm.

FIGS. 2a and 2b show examples of apparatus to carry out the process shown in FIGS. 1a-1g. In FIGS. 2a and 2b, first and second calendering roller sets 38, 40 (e.g., each including an upper calender roller 20 and a lower calender roller 22) are provided so that the calendering can be performed in two stages. The pressure exerted on the top and bottom plates 16 and 18 by the second calendering roller set can be the same as the pressure exerted by the first calendering roller set, or different. For example, the pressure exerted by the second calendering roller set could be greater than that of the first calendering roller set to gradually increase the compaction of the powder 10, as discussed above. In an alternative implementation, the pressure exerted by the second calendering roller set could be less than that of the first calendering roller set to provide a smoothing effect to even out any powder layer distortion which may have been caused by the first calendering roller set.

As also shown in FIGS. 2a and 2b, the apparatus also includes one or more mechanisms, following the calendering operation on a given layer, to rotate or flip the plates 16 and 18. As discussed above, this flipping can include turning each plate over so the upper side becomes the lower side (FIG. 2a). As illustrated, a first mechanism rotating the first (top/upper) plate such that Side A becomes Side B, and Side B become Side A, and a second mechanism rotating the second (bottom/lower) plate such that Side C becomes Side D, and Side D becomes Side C. In a specific implementation, one rotating/switching mechanism can be utilized to rotate both plates. Alternatively, or in addition, the top and bottom plates could be switched with one another (FIG. 2b) so that the top plate with Sides A and B becomes the bottom plate and the bottom plate with Sides C and D becomes the top plate. As discussed above, these flipping/switching steps help ensure even wearing of the plates over many repetitions of the calendering operations.

It is noted that although the above description has primarily been presented in terms of compacting deposited powder layers in the environment of additive manufacturing, such as 3D printing, the apparatus and method of this disclosure is not limited to only such structure, and they could be used in any situation where it is desired to compact green, non-cured powder in conjunction with processing of the powder in a plurality of different stations.

In the following, further features, characteristics and advantages of the instant application will be described by means of items:

Item 1: A method for calendering a powder layer formed on a substrate, including placing the substrate on a first plate, placing a second plate over the powder layer so that the substrate and the powder layer are sandwiched between the first plate and the second plate to form a multilayered structure comprising the first plate, the substrate, the powder layer and the second plate, and calendering the multilayered structure between a top calendering roller and a bottom calendering roller.

Item 2: The method of item 1, wherein the substrate is comprised of a flexible material, and wherein the multilayered structure further comprises a protective layer comprised of a flexible material located on top of the powder layer between an upper surface of the powder layer and a lower surface of the second plate.

Item 3: The method of item 1 or 2, wherein the first and second plates are comprised of a rigid material.

Item 4: The method of any one of items 1-3, wherein the substrate and the protective layer are both comprised of the same material.

Item 5: The method of any one of items 1-4, wherein the substrate and the protective layer are both comprised of Mylar.

Item 6: The method of any one of items 1-5, further comprising switching the first and second plates with one another and repeating the calendering step.

Item 7: The method of any one of items 1-6, further comprising rotating the first and second plates and repeating the calendaring step.

Item 8: An apparatus for calendering a powder layer formed on a substrate, including a pair of plates, comprised of a first plate and a second plate configured to sandwich the substrate and the powder layer between the first plate and the second plate to form a multilayered structure comprising the first plate, the substrate, the powder layer and the second plate, and a top calendering roller and a bottom calendering roller configured to calender the multilayered structure therebetween.

Item 9: The apparatus of item 8, wherein the substrate is comprised of a flexible material, and wherein the multilayered structure further comprises a protective layer comprised of a second flexible material located on top of the powder layer between an upper surface of the powder layer and a lower surface of the second plate.

Item 10: The apparatus of item 8 or 9, wherein the first and second plates are comprised of a rigid material.

Item 11: The apparatus of any one of items 8-10, wherein the substrate and the protective layer are both comprised of the same material.

Item 12: The apparatus of any one of items 8-11, wherein the substrate and the protective layer are both comprised of Mylar.

Item 13: The apparatus of any one of items 8-12, further comprising a mechanism to switch a location of the first and second plates.

Item 14: The apparatus of any one of items 8-13, further comprising a first mechanism to rotate the first plate and a second mechanism to rotate the second plate.

Item 15: The apparatus of any one of items 8-14, further comprising a first compliant layer located between the protective layer and the lower surface of the second plate.

Item 16: The apparatus of any one of items 8-15, further comprising a second compliant layer located between an upper surface of the second plate and the top calendering roller.

Item 17: The apparatus of any one of items 8-16, further comprising a third compliant layer located between a bottom surface of the substrate and an upper surface of the first plate.

Item 18: The apparatus of any one of items 8-17, further comprising a fourth compliant layer located between a lower surface of the first plate and the bottom calendering roller.

Item 19: The apparatus of any one of items 8-18, wherein each of the first to fourth compliant layers has a thickness between 100 μm and 2 mm.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein.

Unless otherwise stated, all measurements, values, ratings, positions, magnitudes, sizes, and other specifications that are set forth in this specification are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The invention claimed is:

1. A method for calendering a powder layer on a substrate for additive manufacturing, comprising:
   placing the substrate, supporting the powder layer, on a first plate;
   placing a second plate over the powder layer to sandwich the substrate and the powder layer between the first plate and the second plate to form a multilayered structure, the multilayered structure comprising the first plate, the substrate, the powder layer, and the second plate;
   calendering the multilayered structure between a top calendering roller and a bottom calendering roller; and
   rotating the first plate and the second plate and repeating the calendaring step.

2. The method of claim 1, further comprising synchronizing a linear speed of the substrate and a rotary speed of the top calendering roller and the bottom calendering roller.

3. The method of claim 1, further comprising performing one or more calendering of the multilayered structure while iteratively increasing the pressure of calendering to gradually compact the powder in the powder layer.

4. The method of claim 1, further comprising placing one or more compliant layers on the multilayered structure to compensate for any surface roughness present within the powder layer and minimizing any non-uniformity within the distribution of powder in the powder layer.

5. The method of claim 4, wherein each of the one or more compliant layers has a thickness between 100 μm and 2 mm.

6. The method of claim 1, further comprising placing one or more compliant layers inside the multilayered structure and between the first plate and the second plate to compensate for any surface roughness present within the powder layer and minimize any non-uniformity within the distribution of powder in the powder layer.

7. The method of claim 6, wherein each of the one or more compliant layers has a thickness between 100 μm and 2 mm.

8. A method for calendering a powder layer on a substrate for additive manufacturing, comprising:
   placing the substrate, supporting the powder layer, on a first plate;
   placing a second plate over the powder layer to sandwich the substrate and the powder layer between the first plate and the second plate to form a multilayered structure, the multilayered structure comprising the first plate, the substrate, the powder layer, and the second plate;
   calendering the multilayered structure between a top calendering roller and a bottom calendering roller; and
   periodically turning over the first plate and the second plate after one or more calendering operations.

9. The method of claim 8, further comprising placing a flexible protective layer on the powder layer and between the multilayered structure.

10. The method of claim 8, further comprising synchronizing a linear speed of the substrate and a rotary speed of the top calendering roller and the bottom calendering roller.

11. The method of claim 8, further comprising calendering the multilayered structure between a second top calendering roller and a second bottom calendering roller, wherein the pressure exerted by the second top calendering roller is greater than the pressure exerted by the second bottom calendering roller to gradually increase the compaction of the powder.

12. The method of claim 8, further comprising performing one or more calendering of the multilayered structure while iteratively increasing the pressure of calendering to gradually compact the powder in the powder layer.

13. The method of claim 9, further comprising removing the flexible protective layer from the top of the powder layer without changing the morphology of the powder in the powder layer.

14. The method of claim 8, further comprising placing one or more compliant layers on the multilayered structure to compensate for any surface roughness present within the powder layer and minimizing any non-uniformity within the distribution of powder in the powder layer.

15. The method of claim 14, wherein each of the one or more compliant layers has a thickness between 100 μm and 2 mm.

16. The method of claim 8, further comprising placing one or more compliant layers inside the multilayered structure and between the first plate and the second plate to compensate for any surface roughness present within the powder layer and minimize any non-uniformity within the distribution of powder in the powder layer.

17. The method of claim 16, wherein each of the one or more compliant layers has a thickness between 100 μm and 2 mm.

18. A method for calendering a powder layer on a substrate for additive manufacturing, comprising:
   placing the substrate, supporting the powder layer, on a first plate;
   placing a second plate over the powder layer to sandwich the substrate and the powder layer between the first plate and the second plate to form a multilayered structure, the multilayered structure comprising the first plate, the substrate, the powder layer, and the second plate;
   placing a flexible protective layer on and over the powder layer and between the multilayered structure such that the second plate contacts the flexible protective layer and the flexible protective layer prevents direct contact between the second plate and the powder layer;
   calendering the multilayered structure between a top calendering roller and a bottom calendering roller; and
   removing the flexible protective layer from the top of the powder layer without changing the morphology of the powder in the powder layer.

19. The method of claim 18, further comprising cleaning residual powder adhered to the flexible protective layer.

* * * * *